(12) United States Patent
Rachoori

(10) Patent No.: US 12,717,457 B2
(45) Date of Patent: Aug. 25, 2026

(54) SYSTEM AND METHOD FOR PLACING AND MOVING LOCATION OF BUTTON ON GRAPHICAL USER INTERFACE

(71) Applicant: DISH NETWORK TECHNOLOGIES INDIA PRIVATE LIMITED, Bengaluru (IN)

(72) Inventor: Sandeep Rachoori, Bengaluru (IN)

(73) Assignee: DISH NETWORK TECHNOLOGIES INDIA PRIVATE LIMITED, Bengaluru (IN)

( * ) Notice: Subject to any disclaimer, the term of this patent is extended or adjusted under 35 U.S.C. 154(b) by 24 days.

(21) Appl. No.: 18/238,846

(22) Filed: Aug. 28, 2023

(65) Prior Publication Data

US 2025/0077036 A1 Mar. 6, 2025

(51) Int. Cl.
*G06F 3/0481* (2022.01)
*G06F 3/04845* (2022.01)

(52) U.S. Cl.
CPC ........ *G06F 3/0481* (2013.01); *G06F 3/04845* (2013.01)

(58) Field of Classification Search
CPC .......................... G06F 3/0481; G06F 3/04845
See application file for complete search history.

(56) References Cited

U.S. PATENT DOCUMENTS 5,859,639 A * 1/1999 Ebrahim ............... G06F 3/0481 715/977
7,155,682 B2 * 12/2006 Rodden .................... G09G 5/14 715/788
2003/0007017 A1 * 1/2003 Laffey ................ G06F 3/04812 715/862
2008/0082603 A1 * 4/2008 Mansour .................. H04L 9/40 709/203
2009/0100363 A1 * 4/2009 Pegg ................. G01C 21/3682 715/765
2010/0321323 A1 * 12/2010 Kim ........................ G06F 3/045 715/810
2012/0169613 A1 * 7/2012 Armstrong .......... G06F 3/04886 345/173
2014/0273967 A1 * 9/2014 Kwon ..................... G06F 21/31 455/411
2019/0018588 A1 * 1/2019 DeBates ............... G06F 3/0482
2020/0296317 A1 * 9/2020 Post, Jr. ............... H04N 7/0122

* cited by examiner

*Primary Examiner* — William L Bashore
*Assistant Examiner* — Gregory A Distefano
(74) *Attorney, Agent, or Firm* — Seed Intellectual Property Law Group LLP

(57) ABSTRACT

A system and method for locating an electronic button on a graphical user interface of an electronic device. This includes taking into consideration at least one characteristic of the graphical user interface, determining a location to place the electronic button within the graphical user interface and displaying the graphical user interface on the display of the electronic device, the graphical user interface including the electronic button at the location.

20 Claims, 16 Drawing Sheets

FIG. 9A
IMDb
Big Bug
Original title: BigBug
2022 * TV-MA * 1h51m
908
Comedy
Sci-Fi
906
50
AA
imdb.com
903
901
904
905
902

SYSTEM AND METHOD FOR PLACING AND MOVING LOCATION OF BUTTON ON GRAPHICAL USER INTERFACE

BACKGROUND

In the digital world, there has been a trend to reduce or eliminate mechanical buttons in order to improve aesthetics, reduce size of electronic devices, and avoid failures that can occur with mechanical or faux-mechanical components. In some cases, the utility offered by such buttons may be replaced by interactive "electronic buttons" provided on a display screen, where pressing or covering such electronic buttons achieves the same or similar functionality that a mechanical button has. Such electronic buttons may be added as an accessibility characteristic, allowing for a user to utilize a simple touch gesture instead of more complicated gestures such as swiping or multi-tapping.

One concern with respect to electronic devices is user-friendliness and operability of the graphical user interface (GUI). That is, as the number of functions performed by a given device increase and such a device has been made more compact, there becomes a challenge to design a GUI that can allow users to easily interact with the device. For example, when mechanical buttons are replaced by electronic buttons that need to be provided on the GUI, the GUI may become clunky and it may lead to icons overlapping the electronic buttons. Such a situation may lead to deficient functionality, for example, the electronic device performing an unwanted action or a user otherwise being unable to easily select an icon or an electronic button.

SUMMARY

When a user chooses to include an electronic button as a home button, menu button or otherwise, some embodiments of the instant application allow for the electronic button to be placed at a location that does not interfere with other text, images, or potential user touchpoints on the GUI. For example, such embodiments may allow for a processor of the electronic device to determine where to place the button based upon one or more of a location of text on a particular page and/or within a particular application, the location of images on a particular page and/or within a particular application, or areas at or near where the user may need to contact in order to perform an operation on a particular page and/or within a particular application.

In some embodiments, the electronic button may be moved (e.g., relocated) to a different position based upon predetermined criteria, such as when the user scrolls on the page, changes to a different screen, a different application, or so on. The different position may be determined based upon predetermined criteria, for example, stored rules relating to the relevant application and/or particular page. In some embodiments, the different position may be determined based upon dynamic real time or near-real time analysis with respect to predetermined characteristics on the GUI at a given time.

Owing to such features, the method, system and device of the instant embodiments may advantageously allow for an improved user interface that includes an electronic button, which may be desirable for accessibility (e.g., assistive touch) needs and otherwise for ease of use and to improve a user experience, while ensuring that such an electronic button does not otherwise interfere with other aspects of the GUI, regardless of what the GUI is showing at a given time. This can further advantageously improve the user experience and avoid unintended actions.

In some embodiments, a computer-implemented method for locating an electronic button on a graphical user interface of an electronic device is disclosed. The method includes, taking into consideration at least one characteristic of the graphical user interface, determining a location to place the electronic button within the graphical user interface and displaying the graphical user interface on the display of the electronic device, the graphical user interface including the electronic button at the location.

In some embodiments, a computer-implemented method for locating an electronic button on a graphical user interface of an electronic device is disclosed. The method includes receiving a request to place an electronic button on the graphical user interface and placing the electronic button at a preset location within the graphical user interface. The method also includes receiving a request that effects a change to the graphical user interface, changing the graphical user interface in response to the received request, taking into consideration at least one characteristic of the changed graphical user interface, determining a second location to place the electronic button within the graphical user interface and displaying the graphical user interface on the display of the electronic device, the graphical user interface including the electronic button at the second location.

In some embodiments, a system is disclosed. The system includes one or more processors programmed to determine a location to place an electronic button within a graphical user interface while taking into consideration at least one characteristic of the graphical user interface, and display the graphical user interface on a display of an electronic device, the graphical user interface including the electronic button at the location.

DETAILED DESCRIPTION OF EMBODIMENTS

Examples of electronic devices described herein may be, for example portable multifunction electronic devices, such as a cellular phone, a tablet, or a laptop computer. However, the term is not so limited and can include any electronic device with a graphical user interface, such as fixed display panels in a vehicle, on a wall, and so forth. In the description herein, a cellular phone is used as an exemplary electronic device, though one skilled in the art would recognize that the features of the application described herein can be implemented on other electronic devices. Further, while the cellular phone described herein may be, for example, a iPhone® from Apple Inc. running iOS software, the electronic devices within the scope of the instant disclosure are not so limited, and may include other cellular phones or devices manufactured by other corporations (e.g., Google, Microsoft, and the like) utilizing other software (e.g., Android™, Windows®, and so on).

As described herein, a graphical user interface (GUI) is an interface that allows users to interact with the electronic device through, for example, graphical icons. However, a GUI as described herein may also include text and other options for interaction beyond merely interaction with a graphical icon. Further, while the GUI described herein is responsive to a user touch interaction, other actions, such as a swipe, a hover, keyboard and mouse, and so on, can be utilized in order for a user to provide input to the GUI and await a response from the processor of the electronic device.

Figure 1:
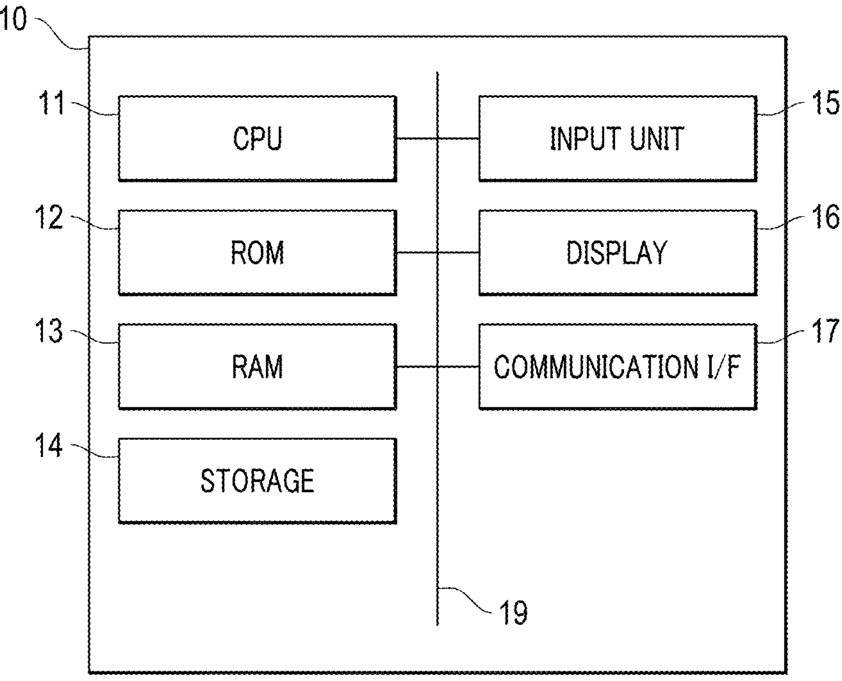
FIG. 1 is a description of hardware of an electronic device according to some embodiments.

As shown in FIG. 1, an exemplary configuration of the hardware of an electronic device 10 is shown. The electronic device 10 may include a central processing unit (CPU) 11 that may act as a hardware processor, one or more of read-only memory (ROM) 12, random-access memory (RAM) 13, and a storage 14, an input unit 15, a display 16, and a communication interface (I/F) 17. These configurations are connected to be able to communicate with each other via a bus 19.

The CPU 11 is a central processing unit, and executes various programs and controls each unit. That is, the CPU 11 reads programs from the ROM 12 or the storage 14 and, using the RAM 13 as a work area, executes the programs. In accordance with the programs recorded in the ROM 12 or the storage 14, the CPU 11 controls each configuration described above and performs various types of processing. In the present exemplary embodiment, the ROM 12 or the storage 14 stores a display control program for controlling display of the GUI on the electronic device 10.

The ROM 12 stores various programs and various data. Serving as a work area, the RAM 13 temporarily stores a program or data. The storage 14 includes storage devices such as a hard disk drive (HDD), a solid state drive (SSD), flash memory, and/or the like, and stores various programs including an operating system, and various data.

The input unit 15 may be a pointing device such as a mouse, and a keyboard, and is used to input various types of information.

The display 16 is, for example, a liquid crystal display, and displays various types of information. The display 16 may adopt a touchscreen system to function as the input unit 15. Further, in some instances, the input unit 15 may be a subcomponent of the CPU 11 that receives input from the keyboard or mouse, or from a user's direct (e.g., via touching or swiping) or indirect (e.g., via hovering) contact with the display 16.

The communication interface 17 is an interface for communicating with other devices, and a standard such as Ethernet (registered trademark), Fiber Distributed Data Interface (FDDI), Wi-Fi (registered trademark), or the like is used.

When executing the above-mentioned display control program, the electronic device 10 realizes various functions using the above-described hardware resources.

Figure 2:
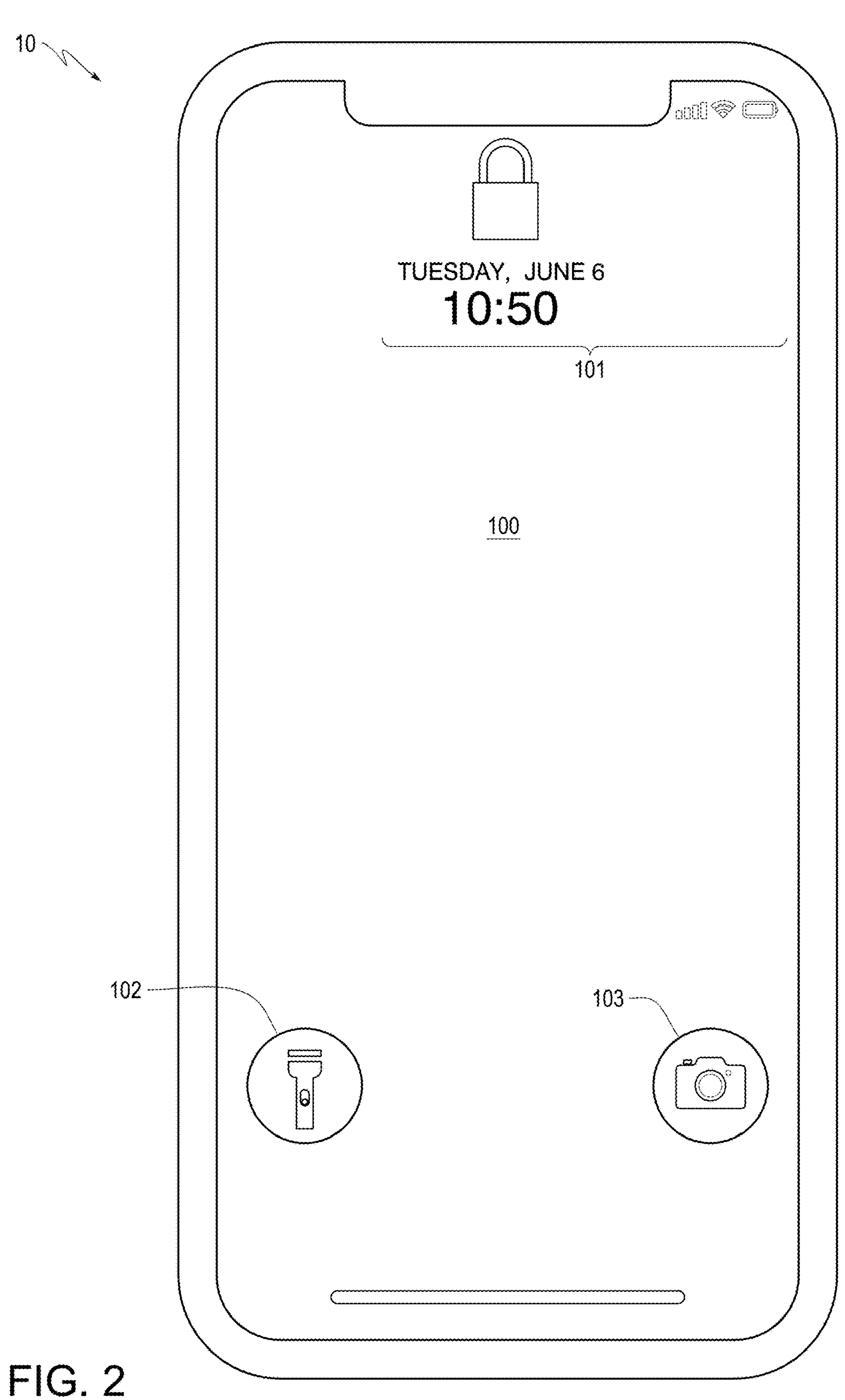
FIG. 2 is a graphical representation of a screen of an electronic device according to some embodiments.

FIG. 2 shows a first screen 100 displaying an exemplary GUI of an electronic device 10. The GUI may be a manifestation of the display 16 referenced with respect to FIG. 1, or may be some subcomponent of the display 16. The GUI may include, for example, a date/time display 101. The date/time display 101 may be implemented by a clock or other time sensor stored within the electronic device (for example within the CPU 11) or may be a product of the device's connection to the internet whereby the date and time is generated from the internet.

Also provided on the first screen 100 of the electronic device 10 are multiple selectable icons. These selectable icons include a flashlight icon 102, which may turn on a flashlight upon a user input to do so, and a camera button 103, which may activate the camera of the electronic device 10 upon a user input. The user input, as described with respect to the input unit 15 and display 16 of FIG. 1, may be a direct touch operation (e.g., the user touching the flashlight icon 102 in order to activate the flashlight function) either by touching or swiping the appropriate location. Further, the user input may be a hover operation, where a user may place his or her finger, other body part, or any object within a predetermined distance (for example, within 1-50 mm, or within 10-40 mm, or within 25 mm), of the icon representing the function to be activated. This may correspond to an indirect contact with the display 16.

Additionally, another method of indirect contact between the user and the display may involve the user providing an external input unit (e.g., input unit 15 as described with respect to FIG. 1) in order to select a function represented by one of the icons on the first screen 100 of the electronic device 10.

Figure 3:
FIG. 3 is a graphical representation of another screen of an electronic device according to some embodiments.

FIG. 3 shows a second screen 200 of electronic device. The second screen 200 may be a screen that is accessible after the user performs an authentication process, such as a fingerprint, an eye scan or other biometrics, or entering in a password. The first screen 100 may be a screen that is accessible even before authentication, and thus, may include only minimal data and potential actions, such as the flashlight and camera.

In some cases, the second screen 200 may be considered a "home screen" as described herein. However, other screens such as the first screen 100 may be considered a home screen when appropriate. In some instances, the home screen can be any screen selected by a user to be the home screen.

The second screen 200 may include various icons, which, when selected by either direct or indirect contact, can initiate various applications. For example, clock icon 201 can initiate an application relating to the electronic device's clock. Icon folder 202 may include a plurality of applications. Upon a user selecting the icon folder 202, larger icons stored within the icon folder may present themselves and may, upon the user selecting such icons, initiate the appropriate application. While not limited, the icon folder 202 includes, for example, a videoconferencing application, a music application, a photos application and a content viewing application.

Though not shown, the second screen 200 may include plural icon folders 202 each housing two or more applications.

The second screen 200 also includes a plurality of other application icons 203. These other application icons 203 may, similarly to clock icon 201 and the applications within icon folder 202, allow for initiation of the requisite application upon a user's direct or indirect contact with the GUI of the electronic device 10.

Toward the bottom of the second screen 200 are additional icons. These icons may represent the most commonly used applications, and may either be preselected by the user or may be automatically placed at such a location according to programmed criteria of the electronic device 10, for example based upon the CPU 11 recognizing an amount of times a particular application has been used within a predetermined period. These additional icons may be, as examples, a phone icon 205 allowing for a phone calling application to be performed, a text message icon 206 allowing for a text messages application to be operated in order for a user to send various types of text messages (e.g., SMS, iMessage, WhatsApp, and the like), an internet browser icon 207 allowing for access to the internet, and a mail icon 208 allowing for access to a user's email box. However, these icons may be placed in a different order, or changed, according to a user preference and/or programmed criteria of the electronic device 10.

Figure 4:
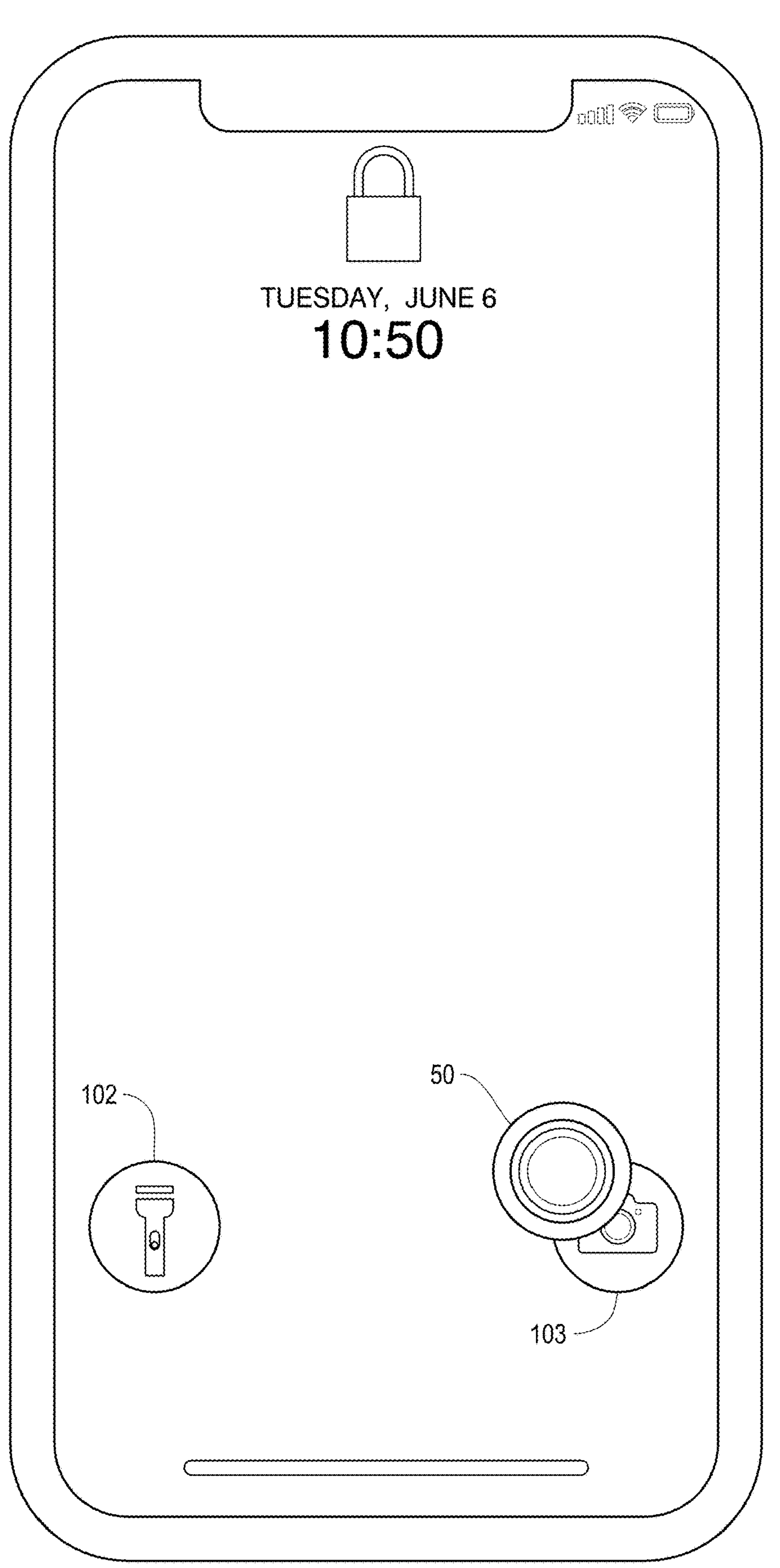
FIG. 4 is a graphical representation of the screen of FIG. 2 with a home button added.

FIG. 4 shows the first screen 100 of FIG. 2, but with an electronic button such as home button 50 added.

In some instances, the home button 50 is added based upon a user's request. For example, the user may access an "accessibility" setting and request that the home button be added to some or all GUIs of the device 10. The home button 50 may, upon direct or indirect contact by the user, allow for either an automatic reversion back to a predetermined home screen, or may open a menu providing for multiple options, one of which may be to revert back to the predetermined home screen. The multiple options may also include actions relating to the functioning of the device, such as raising or lowering the volume, locking the screen rotating the screen and the like, or initiating voice assistance. The home button may be a component of an assistive touch program that allows for improved operability for users that may otherwise have difficulty touching the screen and taking other standard actions (e.g., swiping) that would allow for reversion of the electronic device 10 to the home screen. Further, the home button 50 is used herein only as an example of an electronic button for ease of understanding. In some embodiments, the home button 50 can be replaced by another type of electronic button (e.g., a back button, a forward button, or any button causing an operation).

In some embodiments, the home screen may be the second screen 200. However, the home screen may also be any preselected (either by the user or by the CPU) screen, and may be, for example, the first screen 100 or any other screen, such as a setting screen or a control screen. The home screen may also be changed at any time by the user consulting a menu or other setting relating to the home button.

In embodiments where the home screen is the second screen 200, a user operation (e.g., direct or indirect contact which may include a touch, hover or other operation) of the home button 50 may lead directly to the screen of the GUI reverting immediately to the second screen 200. For example, when an application, or some other page, is opened and showing on the GUI, a touch of the home button 50 may close or otherwise minimize the application or other page and lead to the GUI showing only the second screen. In some embodiments, multiple operations of the home button 50 may be required in order to revert the GUI to the second screen 200. For example, a first operation of the home button 50 may lead to a menu being opened, and a second operation, which may involve touching, hovering, or performing some operation on a menu button titled "home" may be necessary in order for the GUI to revert to the second screen 200.

As can be seen in FIG. 4, a situation where the home button 50 is placed on the GUI that is displaying the first screen 100 exists. In FIG. 4, the system, which may include the CPU 11, which is a hardware processor, and/or or one or more hardware processors of the system, may place the home button 50 in an arbitrary position. This position may be a position that is predetermined, such as an area toward the bottom-right of the screen.

However, the location of the home button 50 on the first screen 100 of FIG. 4 has deficiencies. The home button 50 is placed at a position that overlaps, at least partially, the camera button 103. In this case, it may be difficult for a user to operate one or both of the home button 50 and the camera button 103, and an attempt to utilize one of the two buttons may lead to an incorrect operation. This can cause user uneasiness and increase the difficulty of using the electronic device 1.

Thus, according to some embodiments of the instant application, systems and methods are utilized whereby consideration can be taken with respect to at least one characteristic of the graphical user interface. For example, the location of other "active" buttons (e.g., electronic or physical buttons that, when directly or indirectly contacted can cause an operation to occur) may be taken into consideration, and the system (e.g., by virtue of one or more hardware processors) can determine a location to place the home button accordingly.

In situations where the at least one characteristic is a presence of other active buttons, the system may cause the electronic button to be moved from its preset or preplanned location to another location within the GUI.

Figure 5:
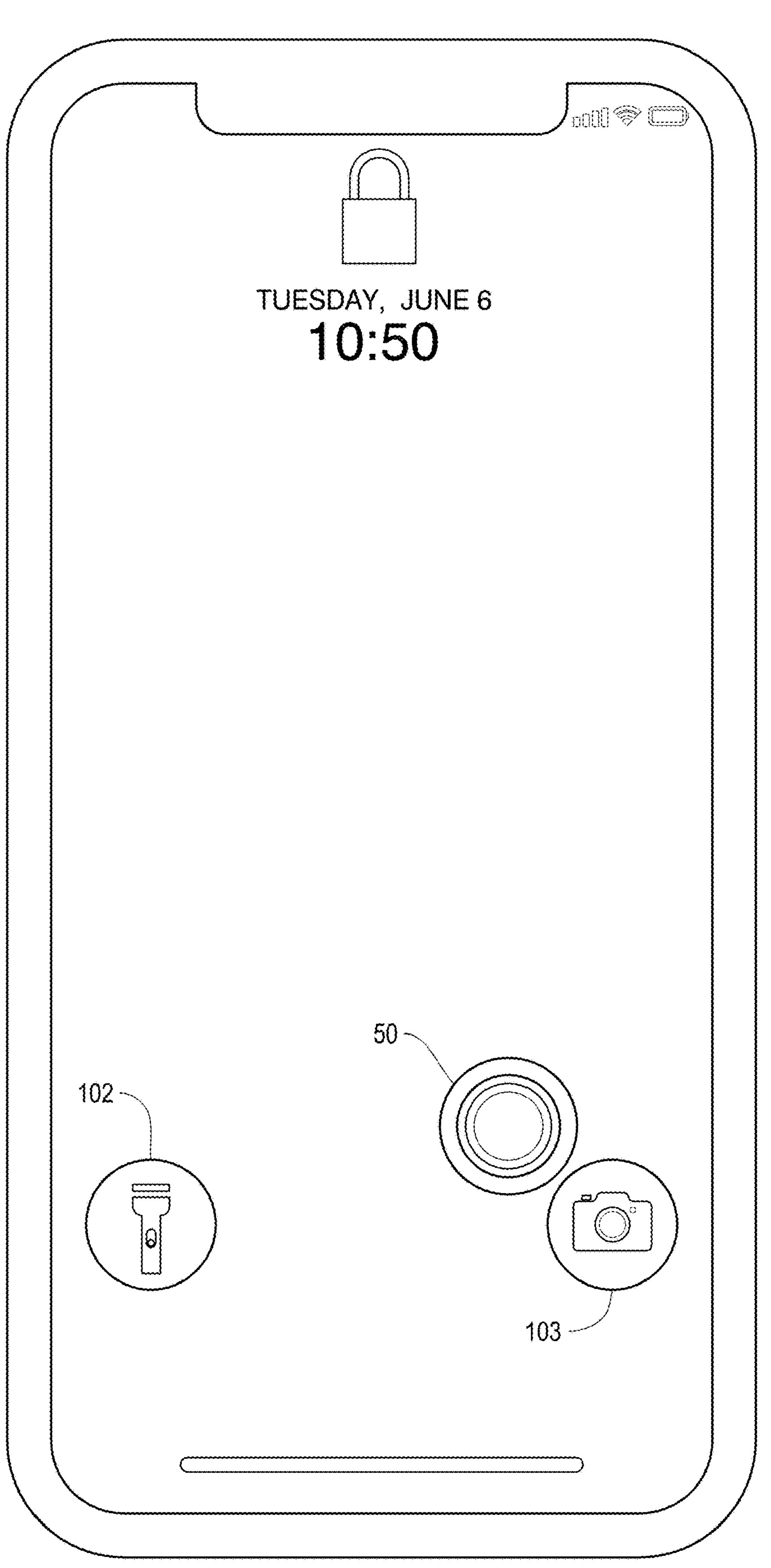
FIG. 5 is a graphical representation of the screen of FIG. 2 with a home button positioned according to some embodiments.

Referring to FIG. 5, the system may recognize that the preset or preplanned location of the home button 50 is suboptimal in view of the presence of the camera button 103. The system may thus determine a location to place the home button taking into consideration the location of camera button 103. In some embodiments, as represented in FIG. 5, the home button 50 may be placed as close as possible to its preplanned location (e.g., the location shown in FIG. 4) while being far enough away from the camera button 103 so as to avoid an unintentional misoperation of one or the other button. That is, the home button 50 may be placed at a position that does not overlap any part of the camera button 103, and may be slightly misaligned in one or both of a horizontal and vertical direction, in order to further avoid a misoperation. In some embodiments, the placement of the home button 50 may be such that it is spaced from the camera button 103 by 5-15 mm in all directions, or 15-50 mm in all directions, or any amount between 1-30 mm in all directions. In some embodiments, the home button 50 may be placed at a location at least the width of an adult thumb (e.g., 19-22 mm) away from the camera button 103 or any other button located on the GUI of the electronic device 10.

In some embodiments, the system determines where to place the home button 50 at each time a screen is changed. There may or may not be a preplanned or preset initial location for the home button 50 (e.g., the location of home button 50 shown at FIG. 4 or otherwise), but in any event, each time a new screen is to be displayed on the display screen, or any display parameter of a new application or the screen generally changes, the hardware processor may be caused to determine where to place the home button 50 based upon the location of the camera button 103 or any other active buttons or selectable items. For example, each time a user or the system generally makes an operation or request to change the screen, the process to provide a location for the home button 50 occurs.

In some embodiments, either in addition to or instead of taking into consideration a location of an active button as the at least one characteristic, an other characteristic (which may also be one of the at least one characteristic) of an amount of blank space on a screen within the GUI may be considered.

Figure 6:
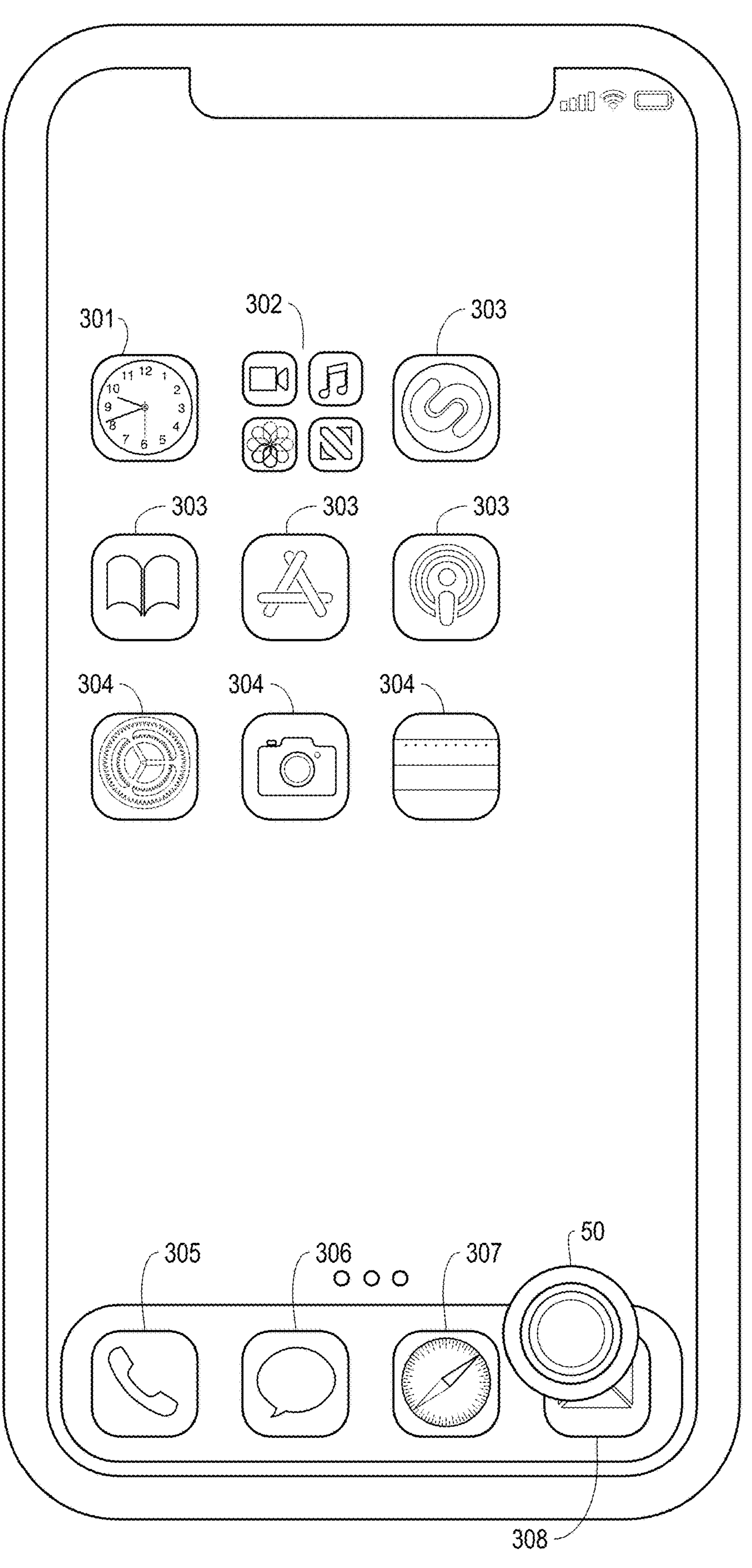
FIG. 6 is a graphical representation of the screen of FIG. 3 with a home button added.

For example, with reference to FIG. 6, another screen with a clock app 301, a folder of apps 302, and various other apps 303, 304 is shown. Further, toward the button of the screen is an area having common functions such as phone calling 305, text messaging 306, internet browsing button 307 and emailing button 308 may be shown. Again, with reference to FIG. 5, the preplanned location of the home button 50 may be somewhere that may overlap an active button, which in this case is emailing button 308.

Figure 7:
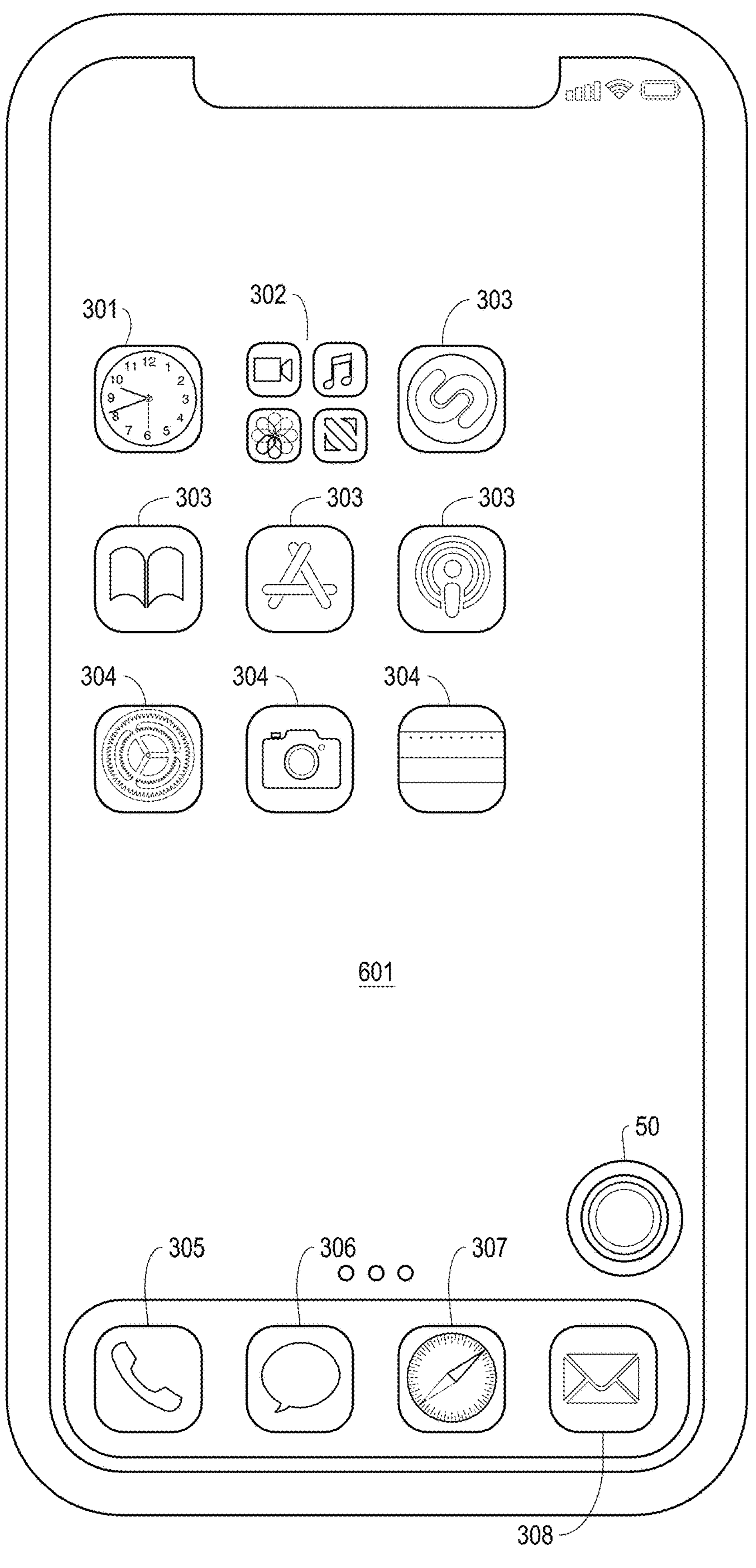
FIG. 7 is a graphical representation of the screen of FIG. 3 with a home button positioned according to some embodiments.

With reference to FIG. 7, either after initially considering the preplanned location for the home button 50 at FIG. 6, or in lieu of such a consideration, the system may place the home button 50 as shown. The home button 50 may be shown taking into consideration where there is blank space 601 on the GUI. In some configurations, the home button 50 may be placed into an area that overlaps with the blank space 601, but also is relatively close to the preplanned location, so as to allow a user not to have to undertake a major change in an expected position of the home button 50. Thus, the consideration of blank space may be the at least one characteristic for placing the home button 50 at a particular location, though this may be in addition to or in lieu of the location of active buttons as the at least one characteristic. As in FIG. 5, the home button 50 may be placed as close as possible to its preplanned location (e.g., the location shown in FIG. 6) while being far enough away from the any other button (e.g., emailing button 308) so as to avoid an unintentional misoperation of one or the other button. The distance away may be similar to that described with reference to the embodiment of FIGS. 4-5.

Figure 8A:
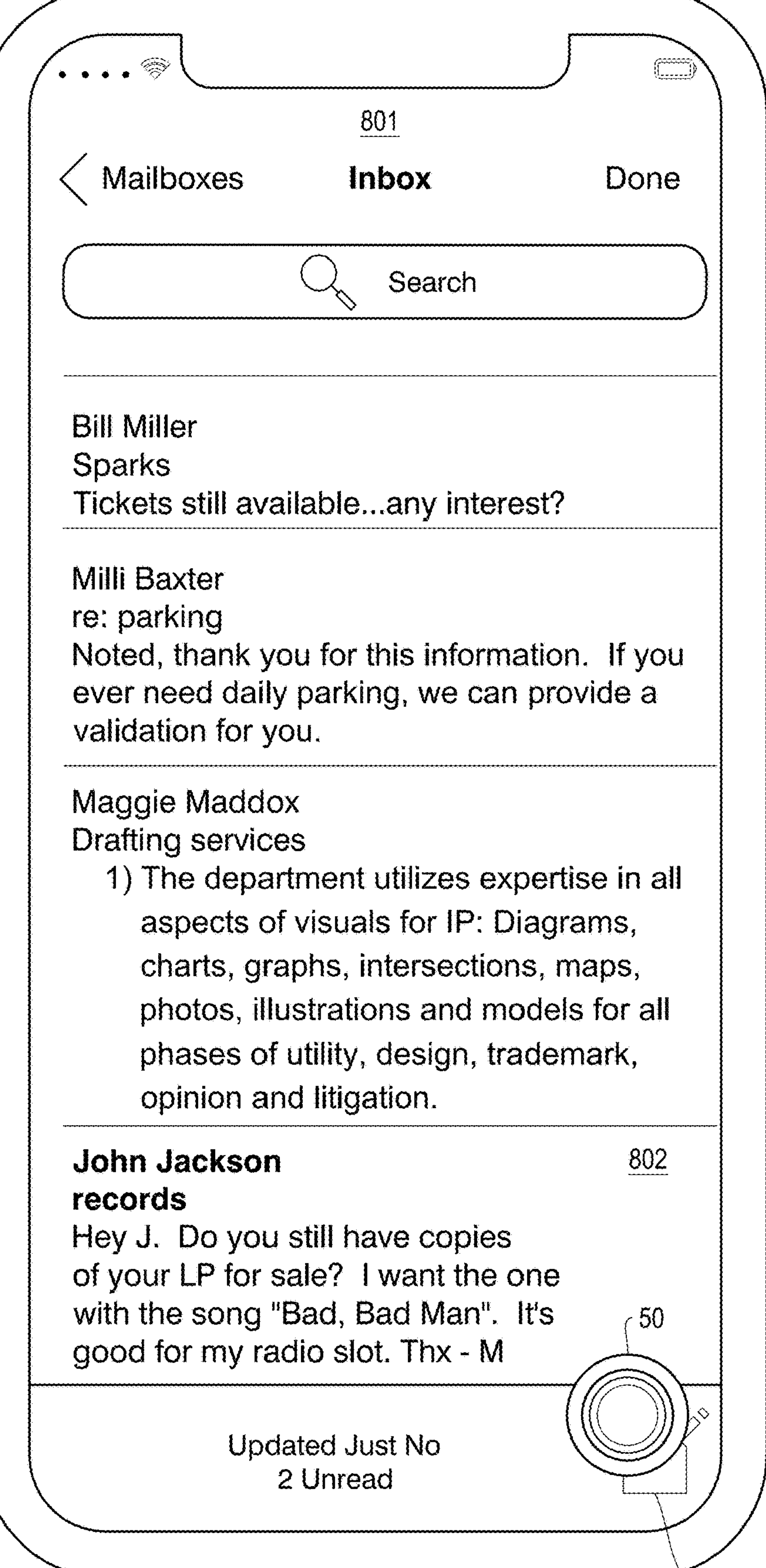
FIGS. 8A-8C are graphical representations of an application screen with a home button added and positioned according to some embodiments.
Figure 8B:
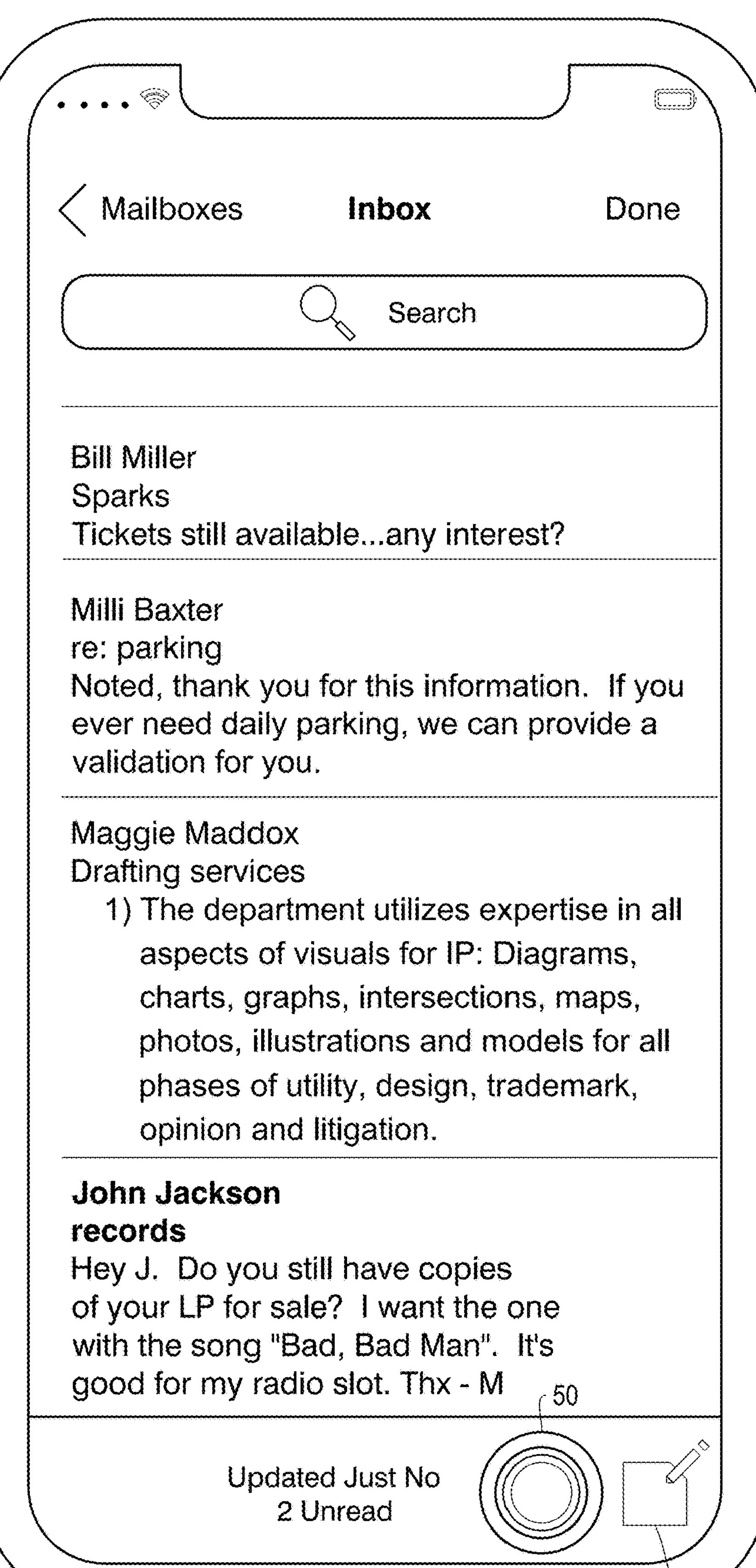

FIGS. 8A and 8B show a GUI of the electronic device when an application such as an email application is being performed. For example, after a user activates an email application by operating emailing button 308 shown in FIG. 6, the GUI may show an entirely new screen. FIG. 8A may show an initial screen 801 of emails including an email 802, and there may be a compose button 803. Again in FIG. 8A, the initial preplanned or preset location for the home button 50 may be one that overlaps compose button 803, or email 802, or both. Thus, taking into consideration at least one characteristic of the application, which may be a location of blank space and/or a location of the active buttons as reflected on the GUI, the home button 50 is placed as in FIG. 8B, at a location less likely to lead to a misoperation.

Further, as shown in FIG. 8B, the location of the home button 50 may be toward the bottom right 804A of the screen and perhaps closer to and not offset in the vertical direction from the compose button 803. This is because another characteristic that the system may take into consideration, either in addition to or instead of the amount of blank space, is a location of text on the screen. That is, by offsetting the button upwards, there is a chance that the home button 50 may overlap some text of email 802. Thus, the home button 50 is placed in a location having the most blank space and/or avoiding all or as much of text as possible, while still being relatively close to the preplanned or preset location shown in FIG. 8A.

Figure 8C:
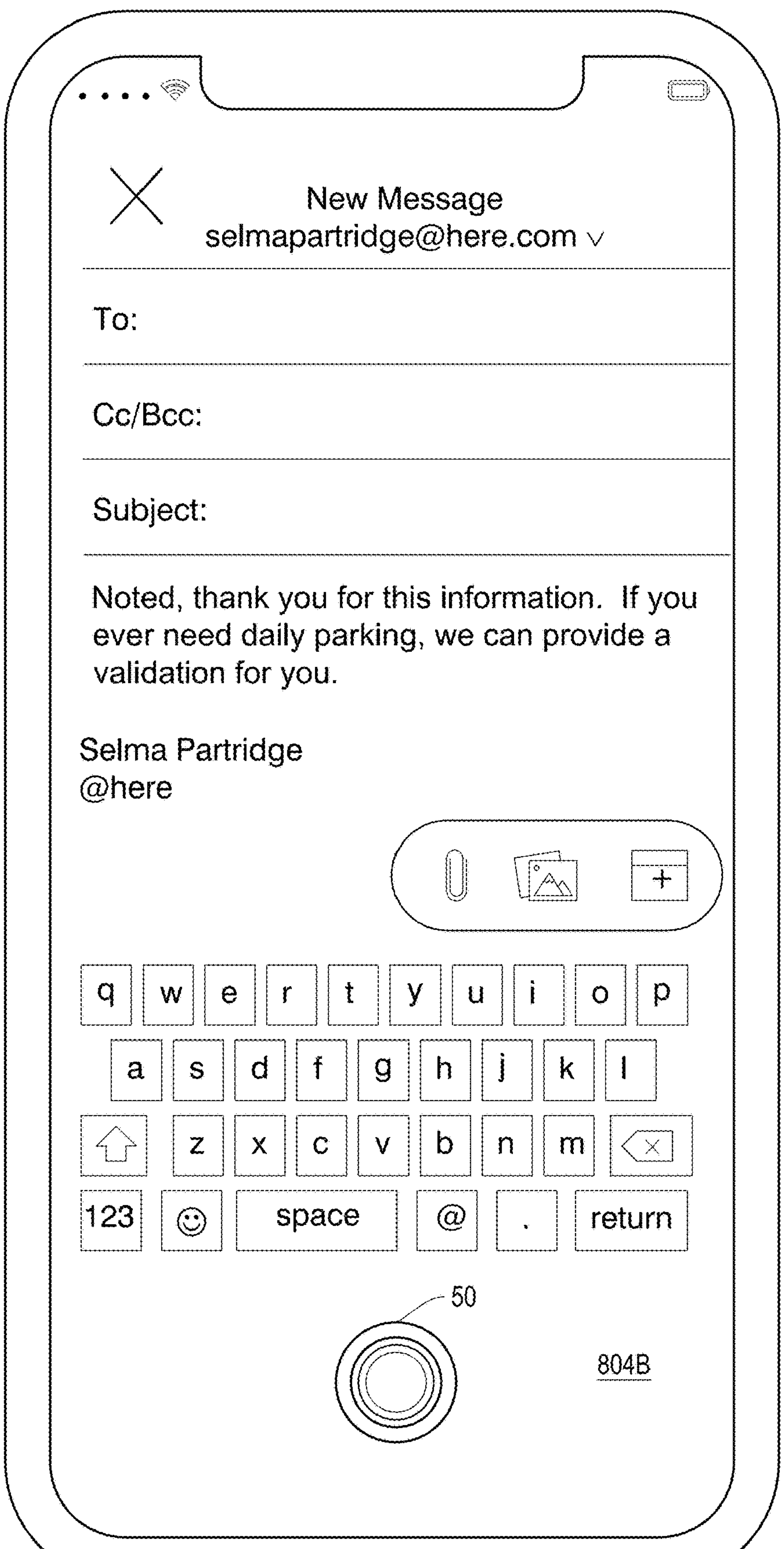

FIG. 8C shows another location of the home button 50, which occurs after the user chooses to begin typing an email using the email application. Here, the home button 50 is placed taking into consideration a location of active buttons (e.g., all typing buttons) and/or any selectable item, and is centered at the bottom middle 804B so as to avoid a mistouch that may occur when the user tries to use both thumbs to type. Of course, other locations of the home button 50 (e.g., closer to the right side but still in blank space) may also be appropriate.

Figure 9A:
FIGS. 9A-9E are graphical representations of other application screens with a home button and positioned according to some embodiments.

FIG. 9A shows an operation where internet searching occurs, for example by virtue of a user selecting internet browsing button 307 in FIGS. 6 and 7. The preset and preplanned of the home button 50 may interfere with one or more buttons 901, 902, 903, 904, 905, such as, in this case, bookmark button 904 and tab button 905. The home button 50 may also interfere with the search bar 906.

Figure 9B:
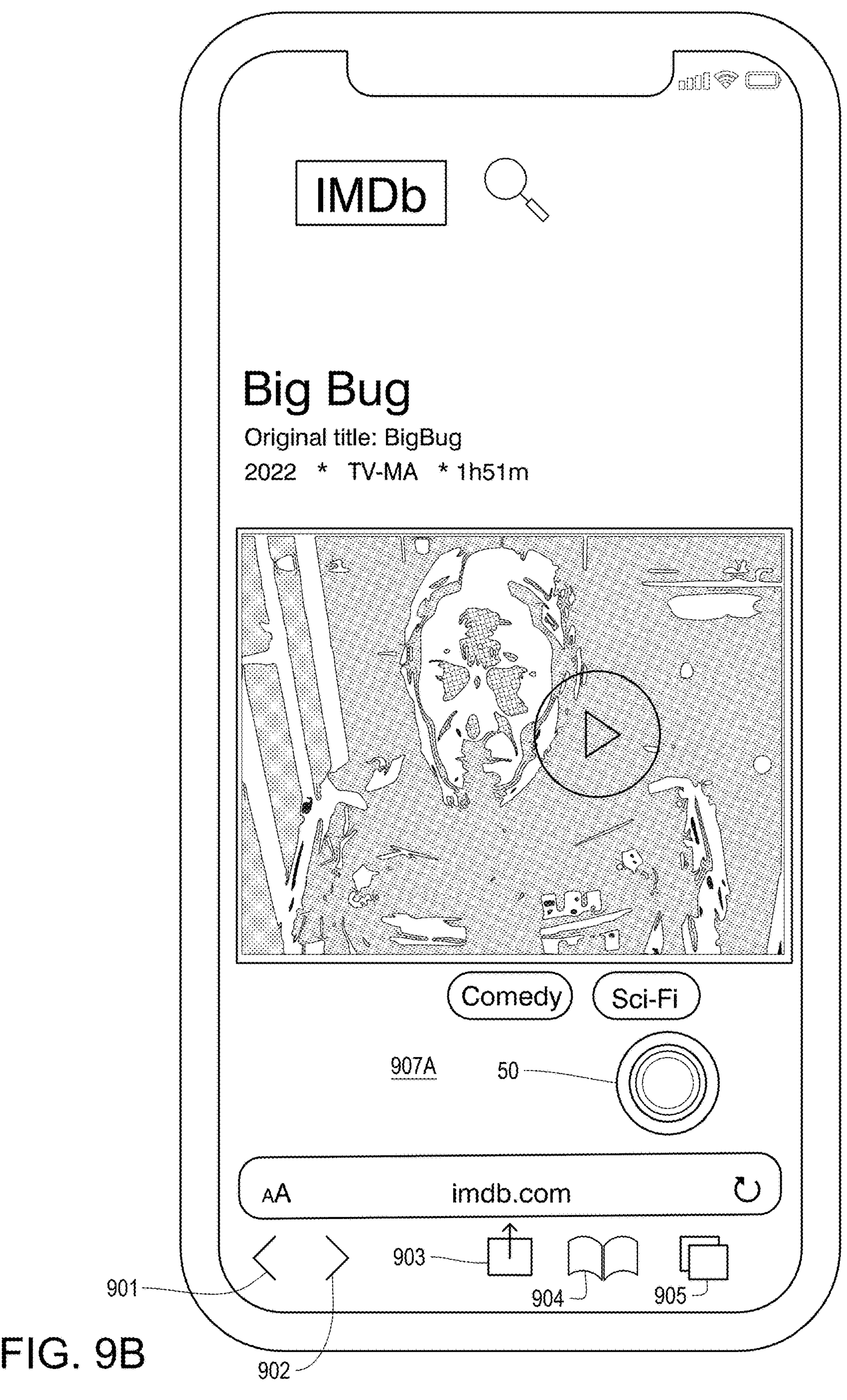

In this case, as shown in FIG. 9B, the home button 50 may be placed in location 907A, which is a distance away from bookmark button 904, tab button 905, and search bar 906. The home button 50 is also placed a distance away from the image 908, which may be a video that can be operated by a user operation, but is not necessarily limited to an operable image. Again, as in other embodiments, the location of the home button 50 can take into consideration one or more characteristics of the GUI.

Figure 9C:
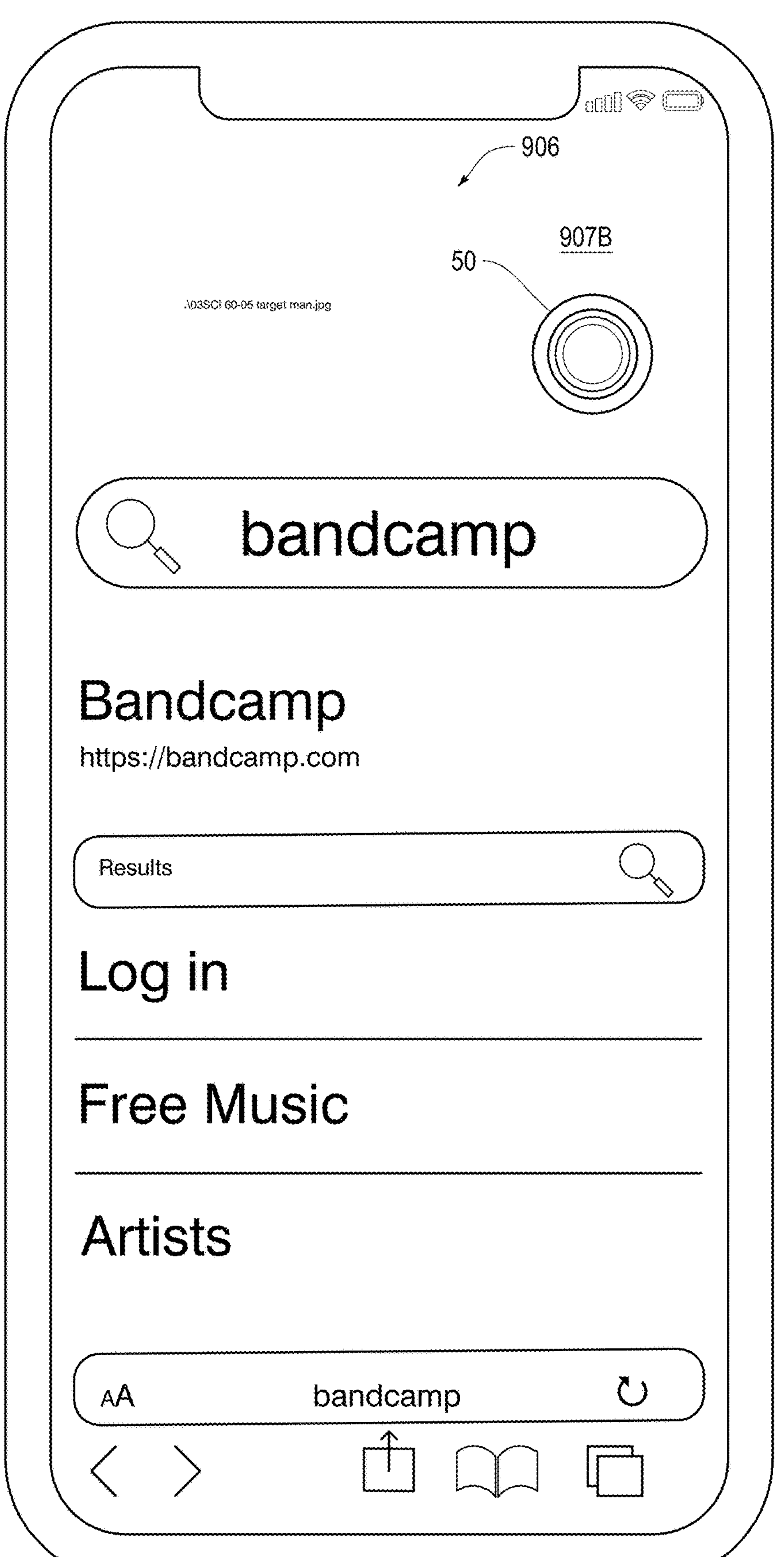

FIG. 9C shows another embodiment of the application where a different webpage is shown. In this case, there is text that reaches relatively close to the bottom of the screen, and accordingly the system takes this into consideration and the home button 50 is placed at a location 907B toward the top of the screen.

Figure 9D:
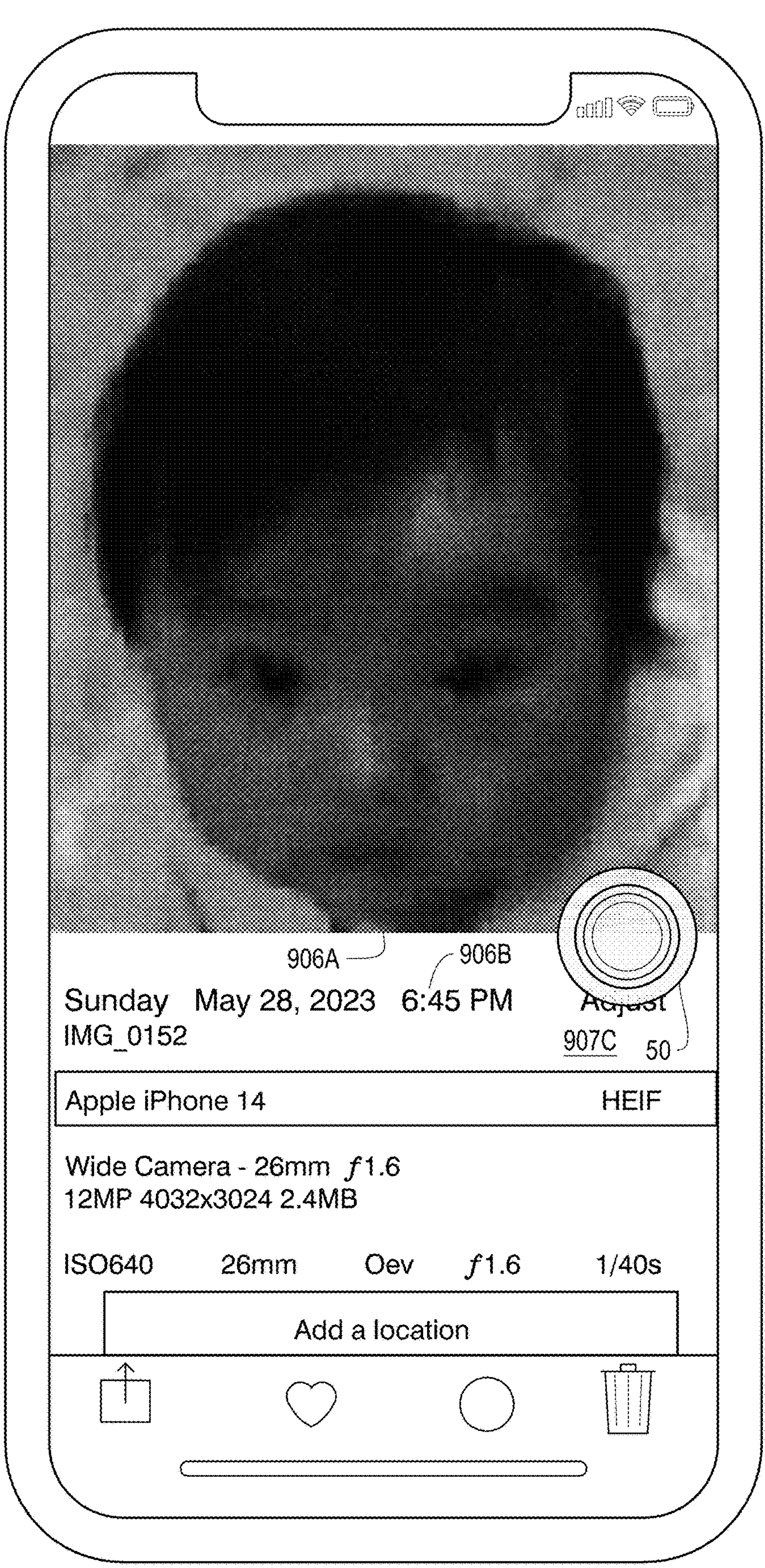
Figure 9E:
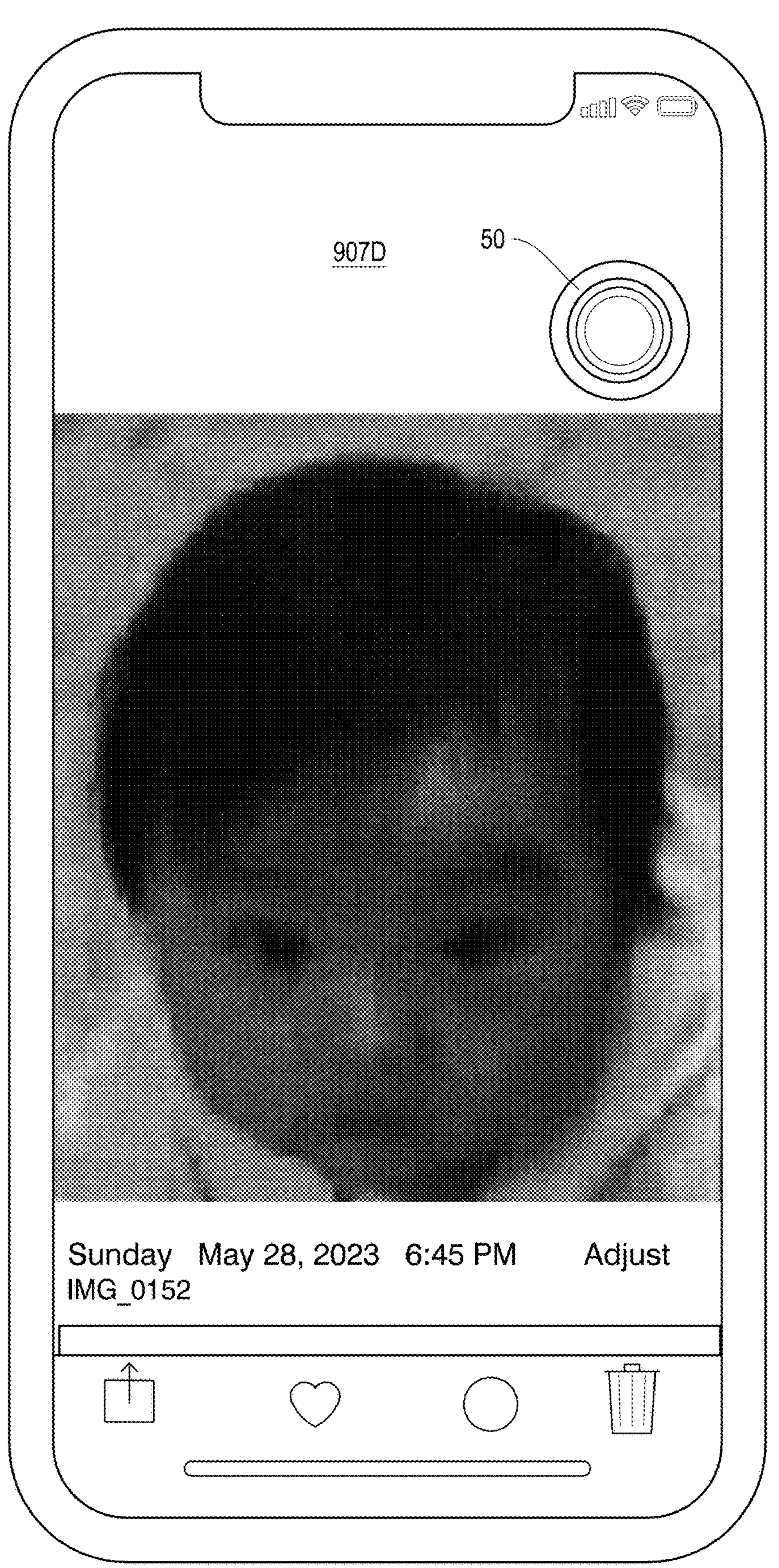

FIG. 9D shows a situation where the home button 50 is placed at a location that overlaps some text 906B and image 906A. In this case, the system determines that there is no location for the home button 50 that can avoid all text, image, and active buttons, and insufficient amount of blank space, and thus, places the home button 50 in a location 907C least likely to cause user misoperation and/or frustration. As shown in FIG. 9E, when the user scrolls on the website and blank space appears, the home button 50 may then be placed into a location 907D that satisfies more characteristics.

In some embodiments, the system may take into consideration multiple characteristics and may rank such characteristics in order of importance. For example, the characteristics being considered may be, in rank order, avoiding overlap of predetermined active buttons, being within a predetermined range from an initial preplanned or preset position, being in a location with the blank space, avoiding other text on the screen and avoiding non-operable images on the screen, avoiding overlap of other active buttons and/or any selectable item, and being offset in both a horizontal and vertical direction from one or more active buttons. Any one or more of these characteristics may be considered as the at least one characteristic, and the system may determine the location using these factors in a hierarchical manner, where if one characteristic is impossible to satisfy in view of other characteristics, the system may choose a location considering the hierarchy.

The ranking of characteristics described above is not so limited, and can be any other ranking of characteristics that can either be predetermined, or manually entered by a user. Further, the system iteratively determines a new ranking of characteristics by performing machine learning. For example, after a predetermined number of uses, the system may learn which characteristics, when not followed, lead to the most misoperations, or a slow operation time, or a combination of both. The system may then change the ranking of characteristics, and/or the location of the home button 50, based upon such learning. This machine learning can be performed by the system logging errors (misoperations) each time a user performs an operation to undo an operation that was performed, or redo a touch or other operation when the operation was not performed, logging the location of the home button 50 at the time of the error, and periodically checking and reconciling the stored data.

Further, in some situations, only one characteristic or only some characteristics are considered. As an example, the system may not consider being within a predetermined range from an initial preplanned or preset position, and may prioritize ensuring that the home button 50 is placed at a space that avoids the most active buttons, text and images, or otherwise at a location with the largest amount of blank space.

Additionally, in some situations where the GUI has many selectable items, the system may choose to place the home button 50 in a place that has less than a predetermined amount of selectable items and/or a location that less selectable items than in other areas. Further and relatedly, there may be some cases where the home button 50 inevitably overlaps one or more selectable item, active button, text or images, but the system will choose a location that interferes with as little as possible, or with the items lowest on the hierarchy of characteristics, or at a location learned to be least likely to cause interference to the user, or at a location selected by the user.

Still further, in some embodiments, the system may check for a location to place the button (using the one or more criteria described above) each time the GUI changes. This may occur each time a new application is loaded, a page is opened, a page is scrolled up, down, left or right, and/or any operation is made. In some embodiments, the home button 50 is placed at the new location after a predetermined time (e.g., 1 second, or 2 seconds) from when the GUI is initially changed, so as to allow time for a user to react and accommodate the change. In other embodiments, the home button 50 is placed at the new location in real time or near real time, e.g., essentially at the same time that the GUI is changed. The electronic device may be programmed to take such actions with respect to the home button 50 regardless of the manufacturer of an application and/or designer of a webpage being viewed. That is, the one or more processors of the electronic device may store instructions to enable it to determine where to locate the home button for any application, web page, and the like.

Figure 10:
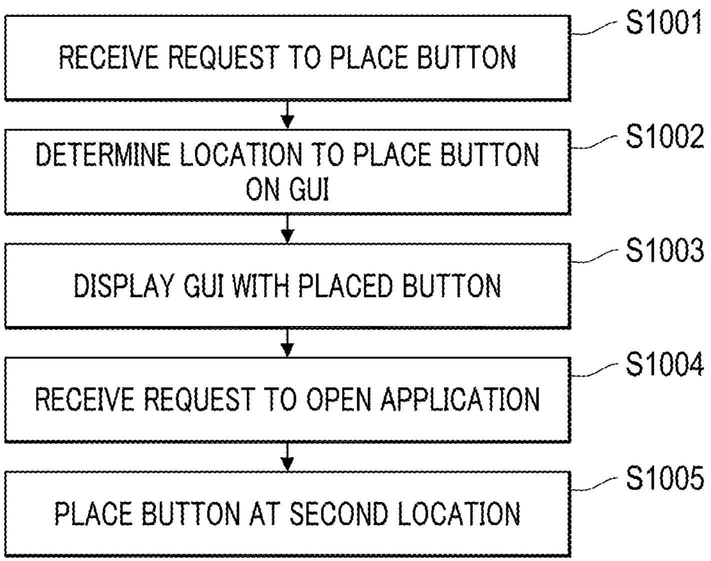
FIG. 10 is a flowchart of an exemplary processing algorithm according to some embodiments.

As shown in FIG. 10, a step S1001 of receiving a request to place a button is shown. The button may be the home button 50, and the request may be received, for example, by the processor of the electronic device 10. The request may be placed by a user (e.g., by the user taking an action to add the home button 50 on the GUI of the electronic device), or may be a preprogrammed request by the device manufacturer.

After the request to place the home button 50 is made, step S1002 of the method includes the system (e.g., the processor of the electronic device) determining a location to place the button on the GUI. The location may be an initial location such as the preset or preplanned location described above. In step S1003 may display a GUI with the button at the preset or preplanned location.

In step S1004, the system may receive a request to open an application. This may be by user request, or at a predetermined time, or the like.

In step S1005, the processor will determine a location to place the home button 50 in view of at least one characteristic of the application as represented on the GUI, and will place the home button 50 at the determined second location, which may be a new location or may be the same location as the preplanned or preset location. Such determinations may occur via the exemplary embodiments described with reference to FIGS. 4-9, above.

Owing to the features described above, the systems and methods described herein allow for an electronic device to include an electronic button, such as a home button or any button that may allow for predetermined operations to occur, to be placed within a GUI in a location less likely to cause misoperations or user confusion or frustration.

Additionally, the one or more processors described herein are referenced as processors of the electronic device, it is within the scope of this application that the electronic device may connect with remote processors (e.g., cloud processors that are provided on remote servers and thus not disposed within hardware of the electronic device), where the remote processors execute some or all of the actions described with reference to FIGS. 4-10 above.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A computer-implemented method comprising:
determining an electronic button to add to a graphical user interface of an electronic device;
determining an order of importance of a plurality of potential characteristics of the graphical user interface, wherein each potential characteristic of the plurality of potential characteristics is ranked in the order of importance based on a number of misoperations of the graphical user interface corresponding to the potential characteristic;
obtaining at least one characteristic of the graphical user interface, wherein the at least one characteristic is one of the plurality of potential characteristics with a highest rank in the determined order of importance;
based on the at least one characteristic of the graphical user interface, determining a location to place the electronic button within the graphical user interface, including:
identifying another electronic button already being displayed on the graphical user interface; and
positioning the electronic button to be spaced away from and vertically or horizontally offset from the other electronic button to avoid an unintentional misoperation of the other electronic button;
displaying the graphical user interface including the electronic button at the determined location; and
iteratively determining a new ranking for the order of importance of the plurality of potential characteristics in response to misoperations relative to the determined location of the electronic button.

2. The method according to claim 1, further comprising:
before the determining the location to place the electronic button within the graphical user interface, receiving a request to present the electronic button on a display of the electronic device.

3. The method according to claim 1, further comprising:
receiving a request to open an application, the application effecting at least one change to the graphical user interface, wherein the at least one characteristic includes a characteristic of the application.

4. The method according to claim 3, wherein the location to place the electronic button is preselected and is manually adjustable by a user.

5. The method according to claim 3, wherein the location to place the electronic button is automatically determined by at least one processor of the electronic device.

6. The method according to claim 3, further comprising moving the electronic button from a first location to a second location different from the first location in response to activation of the application.

7. The method according to claim 1, wherein the at least one characteristic includes two or more characteristics, the two or more characteristics having higher ranks of importance than others of the plurality of potential characteristics.

8. The method according to claim 1, further comprising:
after displaying the graphical user interface, receiving a request to open an application, the application effecting at least one change to the graphical user interface;
determining a further location to place the electronic button based upon a characteristic of the application; and
displaying a further graphical user interface including the application and the electronic button, the electronic button placed at the further location.

9. The method according to claim 8, wherein the method includes determining the further location to place the electronic button each time a display parameter of the application changes.

10. The method according to claim 1, wherein the at least one characteristic is an amount of blank space on the graphical user interface or an amount of selectable items.

11. The method according to claim 1, further comprising:
receiving a request that, when completed, necessitates a change in the graphical user interface irrespective of the electronic button;
determining a further location to place the electronic button based upon the change in the graphical user interface; and
placing the electronic button at the further location and displaying a further graphical user interface, the further graphical user interface including the change in the graphical user interface and the electronic button placed at the further location.

12. The method according to claim 11, wherein the request is received a plurality of different times, and, the determining the further location and placing the electronic button at the further location occurs each time the request is received.

13. A computer-implemented method comprising:
receiving a request to place an electronic button on a graphical user interface;
placing the electronic button at a preset location within the graphical user interface;
receiving a request that effects a change to the graphical user interface;
changing the graphical user interface in response to the received request;
determining that the preset location for the electronic button within the graphical user interface is suboptimal in view of another electronic button being displayed on the changed graphical user interface;
determining an order of importance of a plurality of potential characteristics of the graphical user interface, wherein each potential characteristic of the plurality of potential characteristics is ranked in the order of importance based on a number of misoperations of the graphical user interface corresponding to the potential characteristic, the plurality of potential characteristics include at least a location of an active button and a location of blank space within the graphical user interface, and;

obtaining at least one characteristic of the changed graphical user interface, wherein the at least one characteristic is one of the plurality of potential characteristics with a highest rank in the determined order of importance;

based on the at least one characteristic of the changed graphical user interface, determining a second location to place the electronic button within the graphical user interface that is different from the preset location, including:

positioning the electronic button within a predetermined range from the preset location while being spaced away from and vertically or horizontally offset from the other electronic button to avoid an unintentional misoperation of the other electronic button; and displaying the changed graphical user interface including the electronic button at the determined second location; and iteratively determining a new ranking for the order of importance of the plurality of potential characteristics in response to misoperations relative to the determined location of the electronic button.

14. A system comprising:

one or more processors; and one or more memories storing instructions executable by the one or more processors to:

determine an electronic button to add to the graphical user interface;

determine an order of importance of a plurality of potential characteristics of the graphical user interface, wherein each potential characteristic of the plurality of potential characteristics is ranked in the order of importance based on a number of misoperations of the graphical user interface corresponding to the potential characteristic;

obtain at least one characteristic of the graphical user interface, wherein the at least one characteristic is one of the plurality of potential characteristics with a highest rank in the determined order of importance;

determine a location to place the electronic button within the graphical user interface based on the at least one characteristic of the graphical user interface, including:

identify another electronic button already being displayed on the graphical user interface; and position the electronic button within a predetermined range from the preset location while being spaced away from and vertically or horizontally offset from the other electronic button to avoid an unintentional misoperation of the other electronic button;

display the graphical user interface including the electronic button at the determined location;

iteratively track a predetermined number of uses of the electronic button and misoperations associated with the electronic button; and re-rank the order of importance of the plurality of potential characteristics based on the tracked use and misoperations of the electronic button.

15. The system according to claim 14, further comprising an electronic device, wherein the one or more processors are disposed within the electronic device.

16. The system according to claim 14, further comprising an electronic device and a server remote from the electronic device, wherein at least one of the one or more processors is disposed within the server and communicates with the electronic device to determine the location to place the electronic button.

17. The system according to claim 15, wherein the electronic device is a cellular phone.

18. The system according to claim 15, wherein the electronic device is configured to run a plurality of applications, and the determining the location to place the electronic button occurs upon initiation of each of the plurality of applications.

19. The system according to claim 14, wherein the location to place the electronic button is automatically determined by the one or more processors.

20. The system of claim 14, wherein the one or more processors are further configured to:

after displaying the graphical user interface, receive a request to open an application, the application effecting at least one change to the graphical user interface;

determine a further locating to place the electronic button based upon a characteristic of the application; and display a further graphical user interface including the application and the electronic button, the electronic button placed at the further location.

* * * * *